(12) United States Patent
Auslander et al.

(10) Patent No.: US 6,601,146 B2
(45) Date of Patent: Jul. 29, 2003

(54) TECHNIQUE FOR EFFICIENTLY TRANSFERRING MODERATE AMOUNTS OF DATA ACROSS ADDRESS SPACE BOUNDARY

(75) Inventors: Marc Alan Auslander, Millwood, NY (US); David Joel Edelsohn, White Plains, NY (US); Hubertus Franke, Cortlandt Manor, NY (US); Orran Yaakov Krieger, Brookline, MA (US); Bryan Savoye Rosenburg, Cortlandt Manor, NY (US); Robert William Wisniewski, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/098,061

(22) Filed: Jun. 16, 1998

(65) Prior Publication Data

US 2002/0062401 A1 May 23, 2002

(51) Int. Cl.[7] ............................................... G06F 12/00
(52) U.S. Cl. ...................................... 711/147; 711/202
(58) Field of Search ................................. 709/201, 206, 709/215, 245, 234, 310, 312, 212–219; 711/202, 206, 6, 147

(56) References Cited

U.S. PATENT DOCUMENTS

| | | | | | |
|---|---|---|---|---|---|
| 5,566,302 A | * | 10/1996 | Khalidi et al. | ............... | 709/201 |
| 5,617,537 A | * | 4/1997 | Yamada et al. | ............. | 709/100 |
| 5,860,144 A | * | 1/1999 | Frank et al. | ................ | 711/206 |
| 5,867,656 A | * | 2/1999 | Iwasaki et al. | ............. | 709/215 |
| 5,875,483 A | * | 2/1999 | Tremblay | .................... | 711/210 |
| 5,961,606 A | * | 10/1999 | Talluri et al. | ............... | 709/234 |
| 6,026,475 A | * | 2/2000 | Woodman | .................... | 711/202 |
| 6,055,617 A | * | 4/2000 | Kingsbury | .................. | 711/203 |
| 6,119,214 A | * | 9/2000 | Dirks | ......................... | 711/206 |
| 6,195,107 B1 | * | 2/2001 | Iverson | ....................... | 345/516 |

OTHER PUBLICATIONS

Rochkind "Advanced Unix Programming," 1985, pp. 192–207.*
haviland et al "Unix system Programming," 1987, pp. 199–206.*

* cited by examiner

Primary Examiner—St. John Courtenay, III
Assistant Examiner—Van H. Nguyen
(74) Attorney, Agent, or Firm—Douglas W. Cameron; Anne Vachon Dougherty

(57) ABSTRACT

A method and apparatus for performing efficient interprocess communication (IPC) in a computer system. With this invention, a memory region called the IPC transfer region is shared among all processes of the system to enable more efficient IPC. The unique physical address of the region is mapped into a virtual address from each of the address spaces of the processes of the system. When one of the processes needs to transfer data to another of the processes, the first process stores arguments describing the data in the region using the virtual address in its address space that maps into the unique physical address. When the other or second process needs to receive the data, the second process reads the data from the second region using the virtual address in its memory space that maps into the unique physical address. With this invention, in most cases, control of the IPC transfer region occurs automatically without any kernel intervention.

13 Claims, 4 Drawing Sheets

TECHNIQUE FOR EFFICIENTLY TRANSFERRING MODERATE AMOUNTS OF DATA ACROSS ADDRESS SPACE BOUNDARY

TECHNICAL FIELD

This invention relates to a method and apparatus for performing efficient interprocess communication in a multiprocess system. More specifically, this invention uses a transfer region located at a unique physical address to transfer information between the processes.

DESCRIPTION OF PRIOR ART

Computer operating systems place processes in different address spaces [1]. This is done primarily to be able to limit the ability of a process to inadvertently or maliciously cause damage to other running processes. By default, any writing or reading that occurs within a process occurs only on memory that it has access to, thus preventing it from affecting other processes. However, many times when executing programs, it is important to be able to perform inter-process communication or IPC. At a minimum, the process will need to communicate with the kernel, making requests for resources or services. Frequently, a process also needs to communicate with other processes, e.g., to coordinate together on a given task or to request information from a database server. To communicate within an address space is cheap, but to communicate across address spaces can be expensive since it often involves dispatch overhead, switching between address spaces, and transferring arguments between the address spaces.

In the past, all services of an operating system were contained in one address space, and while this allowed efficient communication, it had a series of unattractive properties. Many operating systems have moved functionality out of the kernel [2][3][4][5] and into user space. This technique is typically called the microkernel approach because it leaves a minimum amount of functionality in the operating system. A single-address-space operating system is more difficult to maintain and more difficult to debug since an error in one portion of a system could affect other unrelated portions. In contrast, a microkernel approach allows operating systems to be maintained easier since any service can (theoretically) be replaced without affecting other aspects of the operating system. It allows easier debugging because errors are contained within the module or service where they originate. However, implicit in this design, is that the various operating system modules implementing the different services reside in separate address spaces, thus increasing the expense of communicating within the operating system. The ability to perform efficient IPC in a microkernel becomes paramount to achieving a successful operating system. Indeed, systems in the past have failed because among other things they moved towards a microkernel architecture without an efficient IPC mechanism.

There are several different techniques that have been used in the past to communicate between processes in different address spaces. A standard technique is for the kernel to copy the arguments of the IPC out of the caller's address space and into the callee's address space [1]. Since processes trust the kernel, and the kernel is considered to be correct, this allows the two processes to safely communicate. Another known technique is for the kernel to map a portion of the caller's address space into the callee's address space. The caller can then place the data into that portion of its address space and the caller can read the data out from there. These and other techniques will perform well on some architectures while poorly on others. Our technique does not require kernel intervention to transfer the arguments and performs well across a wide set of architectures.

Research made significant performance improvements on inter-process communication between the mid-1980s and the mid-1990s. An early technique used to speed up IPC was to avoid requiring extra kernel copying of arguments. This idea led to the technique of using registers [6] to transfer information between the communicating processes. Other work [7] restricted IPC to use a remote procedure call (RPC) model. Further optimizations to the RPC path produced a package called LRPC [8]. This LRPC model was restrictive, and later work [9] relaxed the threading model to allow it to be used in a broader context. Other researchers [10] focused on coordinating the kernel and communicating threads to improve performance. Still other researchers looked at generalizing the interface [11][12] to present a better and more consistent communication to the user while still obtaining good performance. These techniques focused on achieving good uniprocessor performance. These techniques were modified to achieve good performance on multiprocessors [13]. Much of the work described above was targeted towards communicating only as much information as would fit in registers. Or, if the techniques allowed for more information to be transferred, the amount of space required made the approach untenable for a large multiprocessor system with many processors. The mechanism we describe in the next section, not only allows us to transfer moderate amounts of data (more than fits in registers), it also does not use an excessive amount of space. There is a need for a high performance, multiprocessor friendly mechanism which allows for the transfer of moderate amounts of data (more than fits in registers, but less than several megabytes) without using excessive memory space.

SUMMARY OF THE INVENTION

It is an objective of this invention to provide a mechanism for efficiently communicating moderate amounts of data between any two processes residing in separate address spaces.

It is a more specific objective of this invention to reduce kernel access to user space by avoiding mapping overhead during inter-process communication.

It is also an object of this invention to minimize cache and Translation Lookaside Buffer (TLB) misses.

On multiprogrammed systems the ability for processes (entities that exist in separate address space) to communicate is a fundamental service. The importance of this service dramatically increases in modern operating systems that are designed as microkernels whose services, such as file systems or security, are implemented in their own address space. This invention comprises of a mechanism for performing efficient Inter-Process Communication (IPC).

This invention provides for an inter-process communication transfer region having a unique physical address, where the region is shared among all processes on a given processor of a computer system. This unique physical address is then mapped into a virtual address in the address space of each of the processes. When a first of the processes needs to transfer data to a second of the processes, the first process stores arguments describing the data in the region. When a second of the processes needs to receive the data, the second process reads the data from the region by using a second virtual address in its address space which maps into the unique physical address.

It is preferred to use the same virtual address in each of the processes of the system, where the virtual address maps into the unique physical address of the IPC transfer region.

With this invention when control is passed from one process to another process, the IPC transfer region is automatically transferred between processes without any kernel overhead associated with the transfer of control of the region. The IPC Transfer Region is able to be accessed without locking. It is important to efficiently implement IPC transfers in modern operating systems that are designed as microkernels, whose services, such as file systems or security, are implemented in their own address space. The need for locking is obviated by detecting an "in use" IPC Transfer Region at preemption time and saving its state. The IPC Transfer Region effectively extends the register set of a machine by allowing larger amounts (more than fits in registers) of data to be efficiently transferred across address space boundaries. This technique is suitable for transferring moderate amounts of data, where moderate is defined as more than would fit into the registers, but less than several megabytes. Services provided by modern operating systems can take advantage of the IPC Transfer Region to efficiently communicate with other services, the user, and the kernel.

DESCRIPTION OF PREFERRED EMBODIMENT

Figure 1:
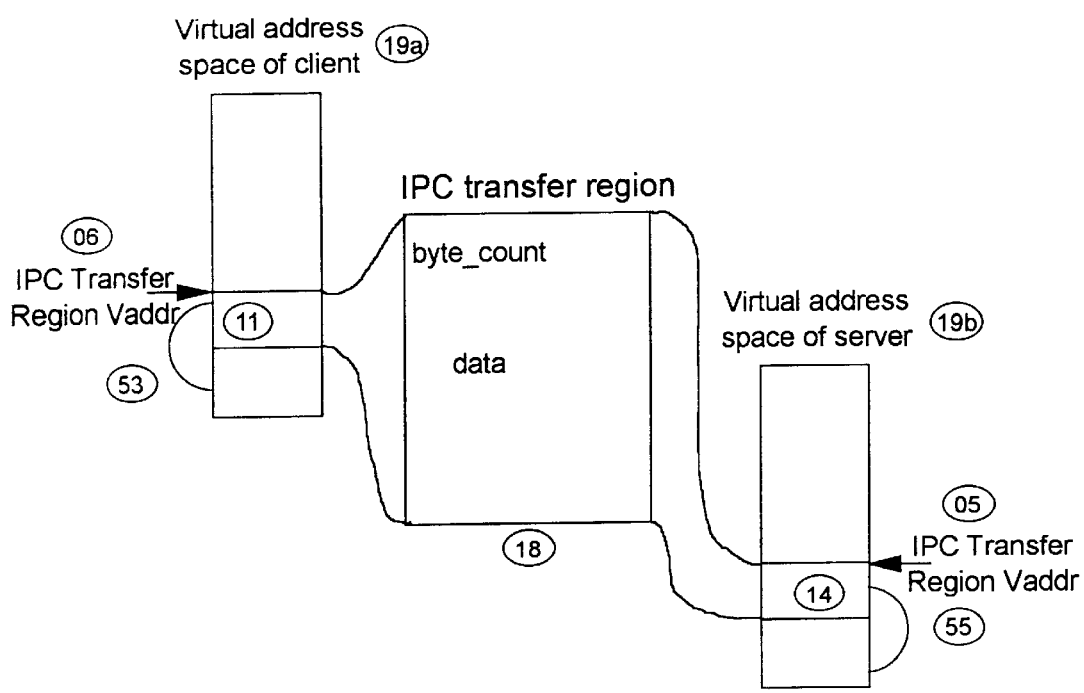
FIG. 1 is a schematic representation of transmitting data between processes of a computer system in accordance with this invention.
Figure 2:
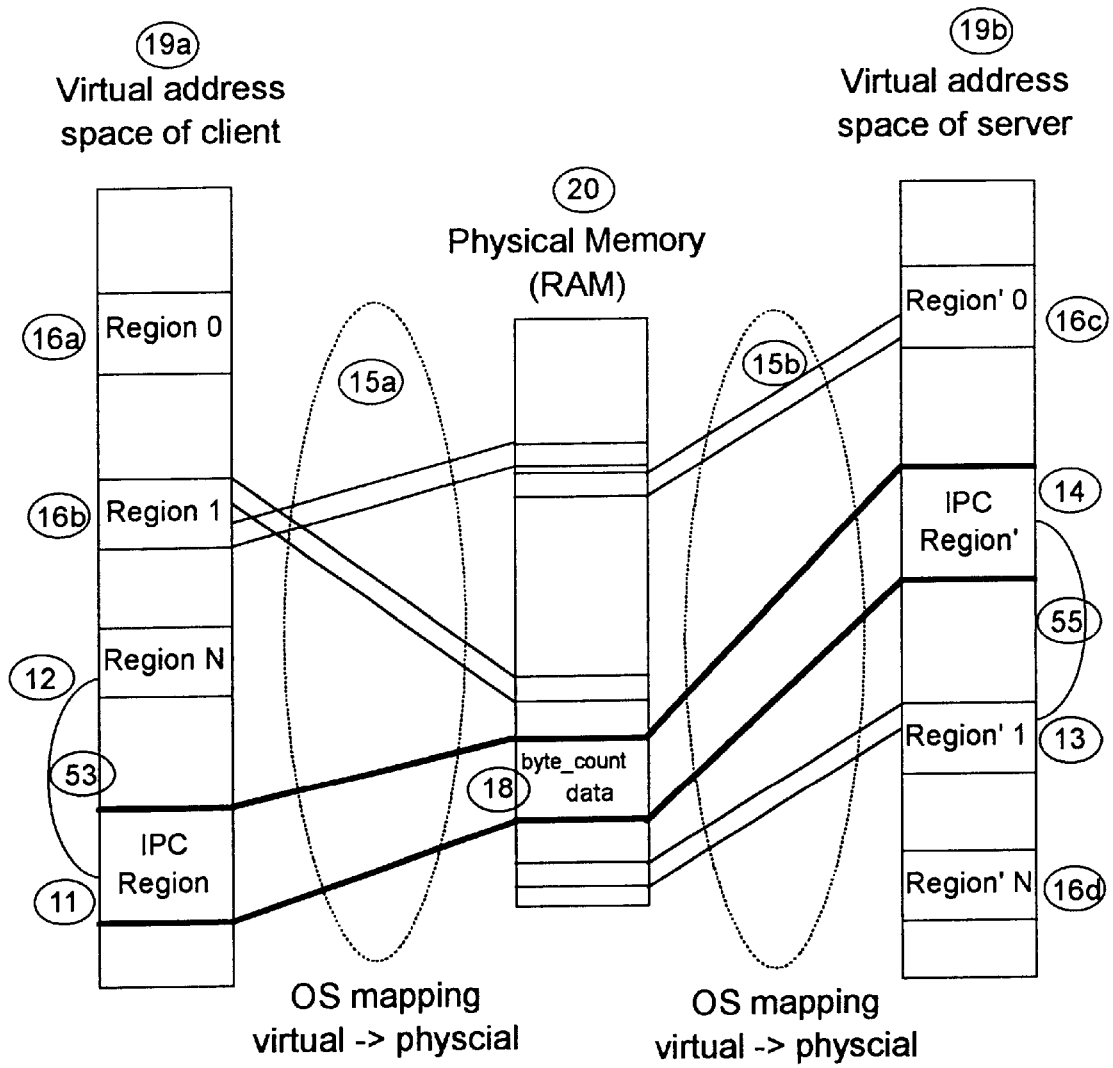
FIG. 2 s a more detailed version of FIG. 1 showing the mapping of the IPC transfer region into virtual addresses of the address space of each of the processes of the system.
Figure 3:
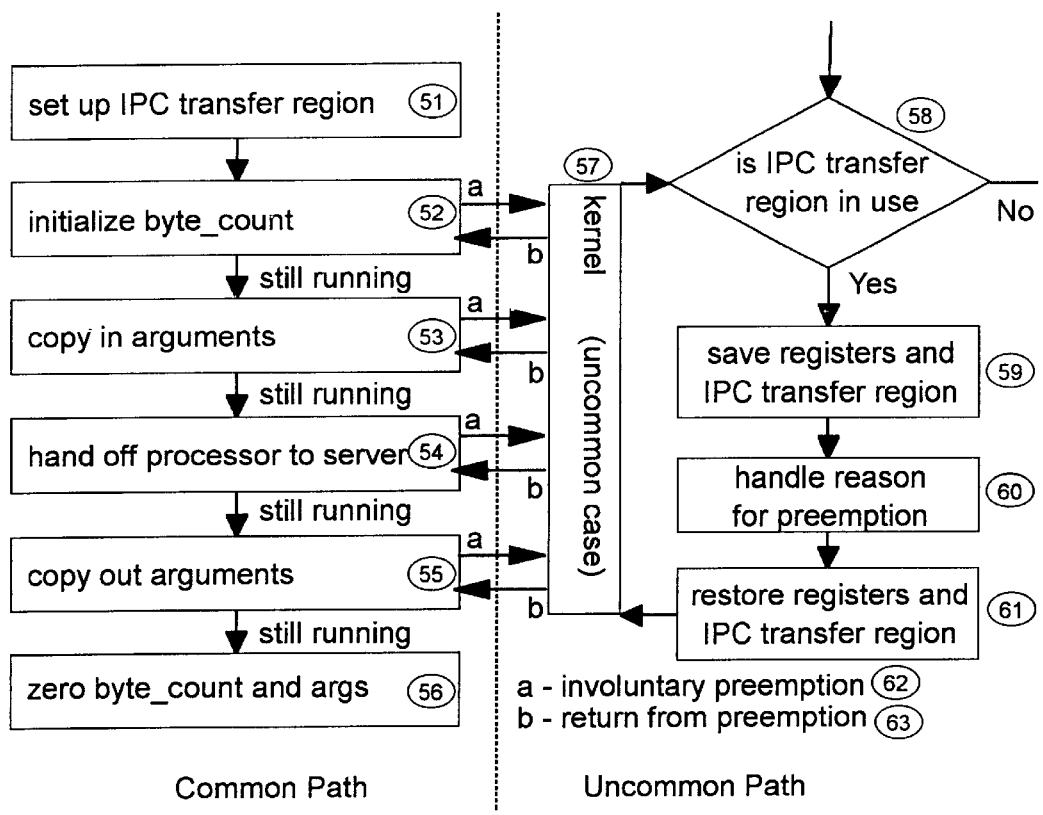
FIG. 3 is a flow chart representing the algorithm of this invention with and without involuntary preemption.
Figure 4:
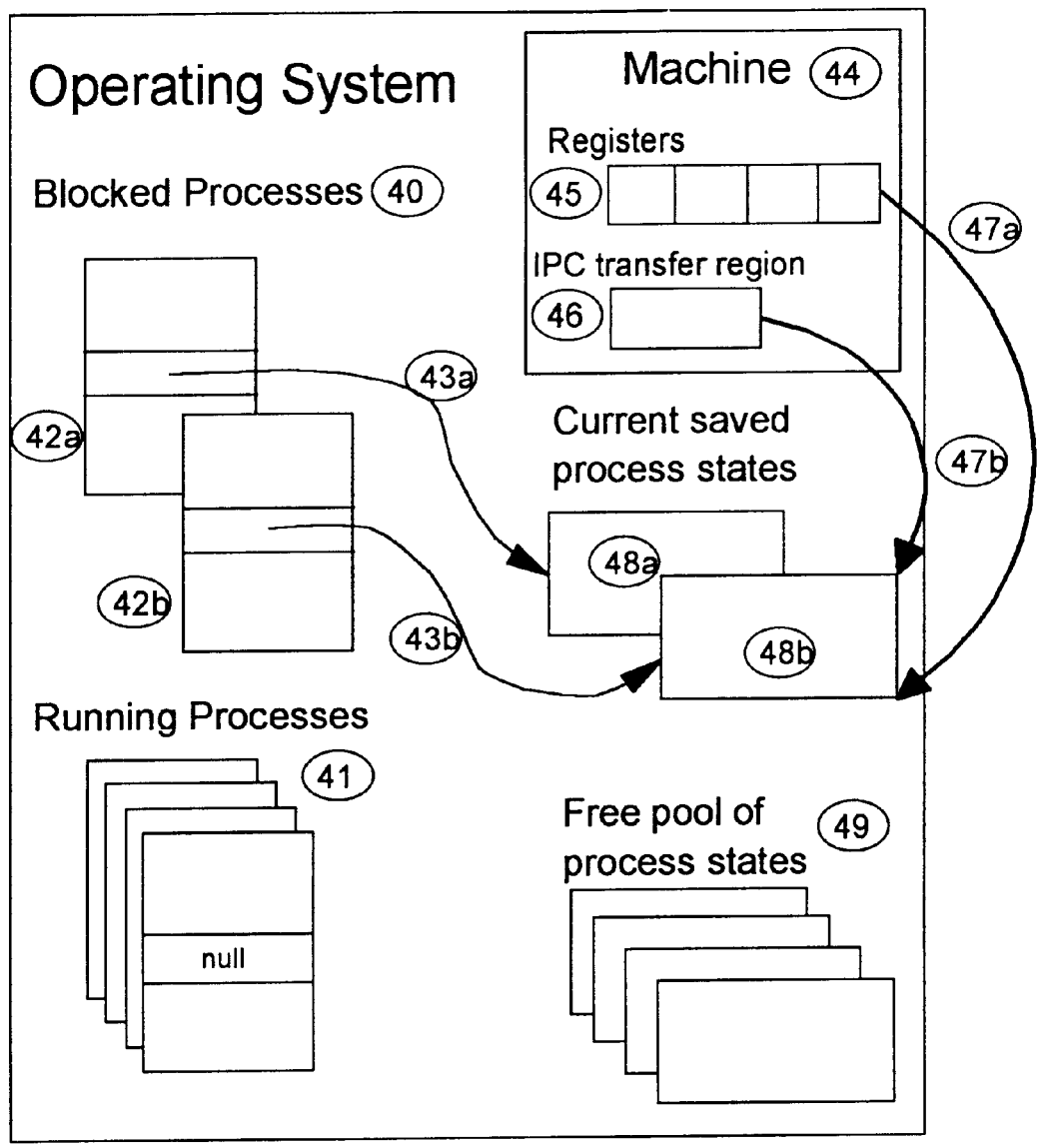
FIG. 4 is a schematic illustration of the actions that need to occur in the event of an involuntary preemption while performing an IPC.

Though our invention is not limited to the following described implementation, this implementation demonstrates the potential advantages of using our mechanism over other mechanisms. The preferred embodiment of this inventions is illustrated in FIGS. 1–4. FIG. 1 is a high-level representation of the mechanism used during the common path of performing an IPC, while FIG. 2 is a more detailed version of the same figure. FIG. 3 is a flow chart representing the entire algorithm, and FIG. 4 represents the actions that need to occur in the uncommon path of involuntary preemption while performing an IPC. When a process is created, the kernel sets up a region of virtual memory region marked as the IPC Transfer Region. See 51 in FIGS. 3 and 11 and 14 in FIGS. 1 and 2. Establishment of virtual memory regions occurs once at process creation. This transfer region is mapped via the operating system (15a and 15b in FIG. 2) at a virtual address in each process. The only requirement is that every process knows the virtual address of the mapped IPC Transfer Region. Therefore, without loss of generality, we always map the region at a well known and constant location in the virtual address of each process. The key idea is that all the virtual mappings of the region point to the same physical address (18 in FIGS. 1 and 2). A special variable is used to indicate whether the IPC Transfer Region is in use and if so how much data it is communicating. This variable is referred to as the byte_count variable, and it is set dynamically for each IPC request. Through this variable the need to perform explicit synchronization to access the IPC Transfer Region is eliminated. Furthermore, the processes do not need to check this variable. We have optimized the common path (no IPC contention) of the mechanism by pushing the cost of any contention for the IPC Transfer Region to the uncommon case of contention among the processors for the IPC region. Described below is the mapping of the IPC Transfer Region virtual address in each process to the same physical one. Such mapping eliminates the need for synchronization in the common path, and reduces the likelihood of contention for the IPC Transfer Region occurring.

For correctness and to obtain high performance on multiprocessor systems, all processes on a specific processor should reference cache and memory local to that processor. To achieve this, a different physical address for the IPC Transfer Region is chosen for each processor. Thus, when a process is migrated from one processor to another, the operating system must change the mapping of the IPC Transfer Region virtual address so that it points to the appropriate physical address for that processor. In contrast to memory mapping or copying data through the kernel, the IPC Transfer Region mechanism can be implemented very efficiently. Assuming that most IPC requests are implemented using hand-off scheduling, the IPC Transfer Region is (like the processor registers) automatically transferred to the server address space. Because all processes can access the IPC Transfer Region, the "automatic transfer" is implicitly occurring without any action. Hence, there is no processing overhead in the kernel to transfer the IPC Transfer Region in the common case. The IPC mechanism is also more TLB (Translation Lookaside Buffer) and cache friendly than other schemes. Since it uses the same address for all inter-process communication, there will not be any TLB misses, and the cache line(s) holding the data is/are very likely to be valid.

As detailed in FIG. 3, there is a series of steps that are followed to perform the IPC. The common path that occurs is that steps 52–56 (FIG. 3) are followed in succession without interruption. In this case the kernel is not involved in copying arguments as part of the IPC. This path is represented in FIGS. 1 and 2 and described in more detail below. In the rare event that an involuntary preemption (62) occurs during step 52 through step 56, the kernel (57) needs to become involved via an involuntary preemption (transition "a" in FIG. 3). The kernel's task at this point is to ensure that the accessing and sharing assumptions of the IPC Transfer Region are not violated and are correctly preserved for the next process. When such an involuntary preemption occurs, steps 58–61 are followed. The purpose of these steps is to save and restore the IPC transfer region so that when control is returned to the interrupted process, it can continue performing the operation is was prior to being interrupted. More specifically, these steps check to see if the IPC Transfer Region is in use (58), and if so saves the registers and IPC transfer Region (59), handles the reason for preemption (60), and restores the registers and IPC Transfer Region, so the process can continue its IPC. FIG. 4 and more detail below describes what needs to occur on this path. After step 61 the kernel returns back to the IPC in progress via a "b" transition. In summary then, to perform an IPC, steps 52–56 occur. Should an involuntary preemption (62) occur during this sequence, the kernel needs to perform steps 58–61, after which point it returns control (63) back to the process that was in the middle of the IPC.

The following describes in more detail what needs to occur at each of these steps. In the common path the IPC proceeds smoothly from step 52 through 56 without interruption. After the description of the common path, we describe the steps needed to be followed in the uncommon path when an involuntary preemption occurs. Here we describe the series of events for the common case. Throughout time, the operating system manages mappings (e.g., 15a and 15b) between the virtual address space of the different processes (e.g., 19a and 19b) and the physical memory (20) of the machine. Specifically, these mappings map different virtual regions (16a, 16b, 16c, 16d, 11, 12, 13, and 14) of the process to the actual physical memory of the machine. These mappings generally occur on a page (region of memory defined by the machine architecture) by page basis. Of concern to this invention is a particular region called the IPC Transfer Region. As mentioned above, at process creation time, the operating system maps a common piece of physical memory into a process's virtual address space and marks it as the IPC Transfer Region. In our system this is mapped at a constant and well-known location. Thus, when a process wishes to access this location, it knows exactly where in its virtual address space the IPC Transfer Region is. The type of inter-process communication provided by the invention is that of a procedure call interface. When process A (a client) wishes to communicate with process B (a server), process A makes a (cross address space) procedure call to process B. The data that is communicated is stored as arguments of the function call. The first step (52) process A must do in performing the IPC is to set the byte_count variable at the beginning of the IPC Transfer Region. This count should be the sum total of the arguments and critical information (e.g., what function is being called) related to the procedure call. Depending on the algorithm used, the byte_count can be modified multiple times until all the parameters have been filled in. It could be computed up front by the compiler or modified as the parameters are copied to the IPC Transfer Region. The important thing that needs to remain invariant is that the byte_count be larger than or equal to the amount of valid data in the IPC Transfer Region. After the byte_count is set, process A copies the data (53 in FIGS. 1, 2, and 3) represented by that count from a place in its memory to the IPC Transfer Region. The setting of the count and copying of data can be all at once or in passes. After all the data has been copied, process A makes a call to process B (54). As part of this call, the processor is now given to process B, which begins to execute. Process B's first job is to copy out the arguments that were placed in the IPC Transfer Region by process A (55 FIGS. 1, 2, and 3). The reason it is important for process B to immediately copy out the arguments is that there is only one IPC Transfer Region per processor; thus each process needs to minimize the amount of time it uses this resource to avoid contention. For security reasons (to prevent data from leaking to other processes), the process may want to zero the data that was in the IPC Transfer Region. The final step in the IPC is for process B to zero the byte count variable (56). This indicates completion of the inter-process communication. At some point, process B may wish to provide information back to process A, or to call another entirely different process. In either event, the above described mechanism is repeated. In the common case this mechanism is very efficient, since the memory employed by the mechanism is frequently used. On most processor architectures, TLB entries may be shared across processes thus reducing the number of TLB misses. Also, since the memory in the IPC Transfer Region is frequently used by all processes, the cache lines representing it have a high probably of being in the cache.

It is possible that an involuntary preemption occurs while steps 52 through 56 are being performed. This preemption could be because an external interrupt comes in with higher priority and needs to be processed by another process, because the current process's time slice is up, or for a variety of other reasons. If this preemption occurs when the system is in the middle of an IPC, then the IPC Transfer Region will be in use. Since there is only one IPC transfer region on each processor, the kernel needs to preserve the data in the region so that once the interrupted process resumes execution, it may continue with the IPC. The data structures and representations for handling this uncommon case appears in FIG. 4. The operating system maintains a set of data structures keeping various information about the processes. In our system, the pertinent (to IPC Transfer Region) ones are a list of the running processes (41), a list of the blocked processes (40, 42a, and 42b), a set of free process states (49), a set of saved process states (48a and 48b), and pointers from the blocked processes to the saved process states (43a and 43b). If process A is currently running and performing an IPC, it will be in the set of running processes (41). If at that point process A is involuntarily preempted, the operating system creates a blocked process data structure to represent it (40). The operating system also takes a process state structure out of the free pool (49) of processor states, saves the appropriate state (44, 45, 46, 47a, and 47b), moves it to the current set of saved process states (48a and 48b), and creates a pointer to it from the blocked process state data structure (43a and 43b). The operating system must copy information about the state of the machine to the saved process state. The machine state normally consists of, among other things, register contents (45), but the introduction of the IPC Transfer Region introduces one more piece of information that must be saved. During the involuntary preemption, the operating system must preserve the data in the IPC Transfer Region by copying it to the saved state associated with the process that is being preempted. If the security level of the system requires that two processes can not share information unless explicitly requested, then the mechanism should also corrupt (zero) the data in the IPC Transfer Region before providing the processor to the next process, otherwise data could leak between unrelated processes. While zeroing the portion of the region where the data resided is not absolutely required, it is necessary to provide the same degree of security commonly offered today by operating systems. However, this zeroing is not sufficient for "trusted" systems requiring a high degree of security, e.g., military installations. A different technique is needed, such as always zeroing the entire region rather than just where the data was stored. While the uncommon case introduces potential overhead to the possible IPC path, it occurs very infrequently and thus does not impact the performance of IPC.

The IPC Transfer Region provides an efficient mechanism for processes wishing to communicate medium amounts of data. For small amounts of data, registers are sufficient, and for very large amounts of data a different technique may provide better performance. However, for moderate amounts of data (between what fits in registers, and a couple of megabytes) the IPC Transfer Regions offers the best performing method for communicating between processes in different address spaces.

The process of copying arguments into the IPC Transfer Region before the IPC and out of the region afterwards can be tedious and is performance sensitive. While not required by this invention, as the user could manually copy the arguments into and out of the IPC Transfer Region when making IPCs, we recommend an automated method for copying the arguments into and out of the IPC Transfer Region. A stub compiler is run over decorated code in order to automatically produce the actual code for copying arguments to and from the IPC Transfer Region. The stub compiler automatically turns a normal-looking procedure call (decorated with symbols to indicate it is an IPC) to the full code needed to copy the arguments in or out and then to make the actual call. This automation leads to an easier programming model for the application writer, reduces potential errors, and provides better performance since we will make sure that the automated method performs this operation in the optimal way on the targeted architecture.

REFERENCES

[1] Tannenbaum, A.: "Distributed Operating Systems", Prentice Hall, ISBN 0-13-219908-4, 1995.

[2] M. Accetta, R. Baron, W. Bolosky, D. Golub, R. Rashid, A. Tevanian, and M. Young, "Mach: A New Kernel Foundation for UNIX Development," Proceedings of the Summer 1986 USENIX Technical Conference, June 1986, pp. 93–112.

[3] B. N. Bershad, S. Savagam, P. Pardyak, E. G. Sirer, M. E. Fiucyznski, D. Becker, C. Chambers, and S. Eggers. "Extensibility, Safety, and Performance in the SPIN Operating System." In Proceedings of the 15 ACM Symposium of Operating System Principles, pages 267–284, Copper Mountain, Colo., December 1995.

[4] D. R. Engler, M. F. Kaashoek, and J. O'Toole Jr. "Exokernel: An Operating System Architecture for Application-level Resource Management." In Proceedings of the 15th ACM Symposium of Operating System Principles, pages 251–266, Copper Mountain, Colo., December 1995.

[5] J. Liedtke, "On Micro-Kernel Construction." In Proceedings of the 15th ACM Symposium of Operating System Principles, pages 237–250, Copper Mountain, Colo., December 1995.

[6] D. R. Cheriton. "An Experiment Using Registers For Message Based Inter-process Communication." Operating Systems Review, October 1984, pp. 12–20.

[7] Michael D. Schroeder and Michael Burrows. "Performance of Firefly RPC." Proceedings of the 12th Symposium on Operating System Principles. December 1989, pp. 83–90.

[8] Brian N. Bershad, Thomas E. Anderson, Edward D. Lazowska, and Henry M. Levy. "Lightweight remote procedure call." Proceedings of the 12th Symposium on Operating System Principles. December 1989, pp. 102–113.

[9] Richard P. Draves, Brian N. Bershad, Richard F. Rashid, and Randall W. Dean. "Using continuations to implement thread management and communication in operating systems."Proceeding of the 13th Symposium on Operating System Principles. October 1991, pp 122–136.

[10] Jochen Liedtke. "Improving IPC by Kernel Design." Proceeding of the 14th Symposium on Operating System Principles. December 1993, pp 175–187

[11] Norman C. Hutchinson, Larry L. Peterson, Mark B. Abbott, and Sean O'Malley. "RPC in the x-Kernel: Evaluating New Design Techniques." Proceedings of the 12th Symposium on Operating System Principles. December 1989, pp. 91–101.

[12] Bryan Ford, Mike Hibler, and Lay Lepreau. "Using Annotated Interface Definitions for Optimize RPC." Technical Report, Department of Computer Science, University of Utah UUCS-95-014.

[13] Benjamin Gamsa, Orran Krieger, and Michael Stumm. "Optimizing IPC Performance for Shared-Memory Multiprocessors." International Conference on Parallel Processing 1994.

Having thus described our invention, what we claim as new and desire to secure by Letters Patent is:

1. In a shared memory computer system having more than two processes and at least one processors a method of providing communication between more than two processes of said system, said method comprising:

a. mapping a single, undivided fixed interprocess communication transfer region having a unique physical address at said shared memory to each of a plurality of virtual addresses, one virtual address for each one of said more than two processes;

b. when a first of said processes needs to transfer data to a second of said processes, storing arguments describing said data in said region by said first process, wherein said region is at said physical address defined by said mapping from a corresponding first virtual address of said first process; and c. when said second process needs to receive said data, said second process accessing said arguments and reading said data from said region, which is identified by said second process by said mapping of said physical address into a corresponding second virtual address of said second process.

2. A method as recited in claim 1, wherein said region resides at the same and well known virtual address in each process of said system.

3. A method as recited in claim 1, wherein said arguments comprise a data byte count indicating the amount of data stored in said region.

4. A method as recited in claim 1, wherein a state of said region is maintained across involuntary preemption via a usage variable.

5. A method as recited in claim 1, wherein said unique physical address maps into a same virtual address for each of said processes.

6. A method as recited in claim 1, wherein said arguments comprise a usage variable indicating whether said region is active.

7. In a shared memory computer system having more than two processes and a plurality of processors a method of providing communication between more than two processes of said system, said method for each of said processors comprising:

a. for each of said processors mapping a single, undivided fixed interprocess communication transfer region having a unique physical address at said shared memory to each of a plurality of virtual addresses in each address space of each of said processes of said each processor;

b. for each of said processors, when a first of said processes of said each processor needs to transfer data to a second of said processes of said each processor, storing arguments describing said data in said region by said first process, wherein said region is at said physical address defined by said mapping from a corresponding first virtual address of said first process; and c. when said second processor needs to receive said data, said second process accessing said arguments and reading said data from said region, which is identified by said second process by said mapping of said physical address into a corresponding second virtual address of said second process.

8. A method as recited in claim 7, wherein said region resides at the same and well known virtual address in each process on said each processor.

9. A method as recited in claim 7, wherein said arguments comprise a data byte count indicating the amount of data stored in said region on said each processor.

10. A method as recited in claim 7, wherein a state of said region is maintained across involuntary preemption via a usage variable on said each processor.

11. A method as recited in claim 7, wherein said unique physical address maps into a same virtual address for each of said processes on each said processor.

12. A method as recited in claim 7, wherein said arguments comprise a usage variable indicating whether said region is active on each said processor.

13. A program storage device readable by a machine, tangibly embodying a program of instructions executable by said machine to perform method steps in a multiprocessor shared memory computer system to provide communication between more than two processes of said system, said method comprising:

a. mapping the physical address at said shared memory for a single, undivided fixed interprocess communication transfer region to a plurality of virtual addresses, one virtual address for each one of said processes;

b. when one process needs to transfer data to another process, storing arguments describing said data in said region; and c. when said other process needs to receive said data, said other process accessing said arguments and reading data from said region.

* * * * *